United States Patent [19]

Williamson

[11] 3,981,232

[45] Sept. 21, 1976

[54] FREE STANDING FRYER

[76] Inventor: Donald Farrington Williamson, 16 Shasta Drive, Thornhill, Ontario, Canada

[22] Filed: June 20, 1975

[21] Appl. No.: 588,864

[52] U.S. Cl. .................................. 99/337; 210/294
[51] Int. Cl.² ......................................... A47J 37/12
[58] Field of Search ............ 99/337, 345, 403, 408, 99/421 H, 421 HV, 427, 447, 483, 323.4, 323.5, 323.6; 55/383, 392, DIG. 27, DIG. 36; 210/162, 263, 274, 294–295, 353, DIG. 8

[56] References Cited
UNITED STATES PATENTS

| | | | |
|---|---|---|---|
| 2,109,796 | 3/1938 | Hirschenfeld | 99/345 X |
| 3,361,055 | 1/1968 | Hondroulis | 99/421 HV |
| 3,614,923 | 10/1971 | Thompson | 99/427 |
| 3,881,408 | 5/1975 | Valor | 100/229 A X |

Primary Examiner—Stanley N. Gilreath
Assistant Examiner—Arthur O. Henderson

[57] ABSTRACT

A free standing fryer such as may be used in commercial installations which includes a cabinet adapted to be supported at a suitable working height, and having glass panels on some of its sides and at least one open side for access to the interior, and having a fat fryer located within the interior of said cabinet and having in the roof of the cabinet outlet means for fumes from the fat fryer, fan means for extracting air and fumes from said cabinet and through said outlet, a plenum chamber located to one side of said fan means, and opening means communicating from said fan means to said plenum chamber, porous tray means located above said plenum chamber and closing the same, said tray means being adapted to support a predetermined depth of filter media thereon, said filter media being porous to air, and being absorptive with respect to said odors and fumes from said fryer.

9 Claims, 8 Drawing Figures

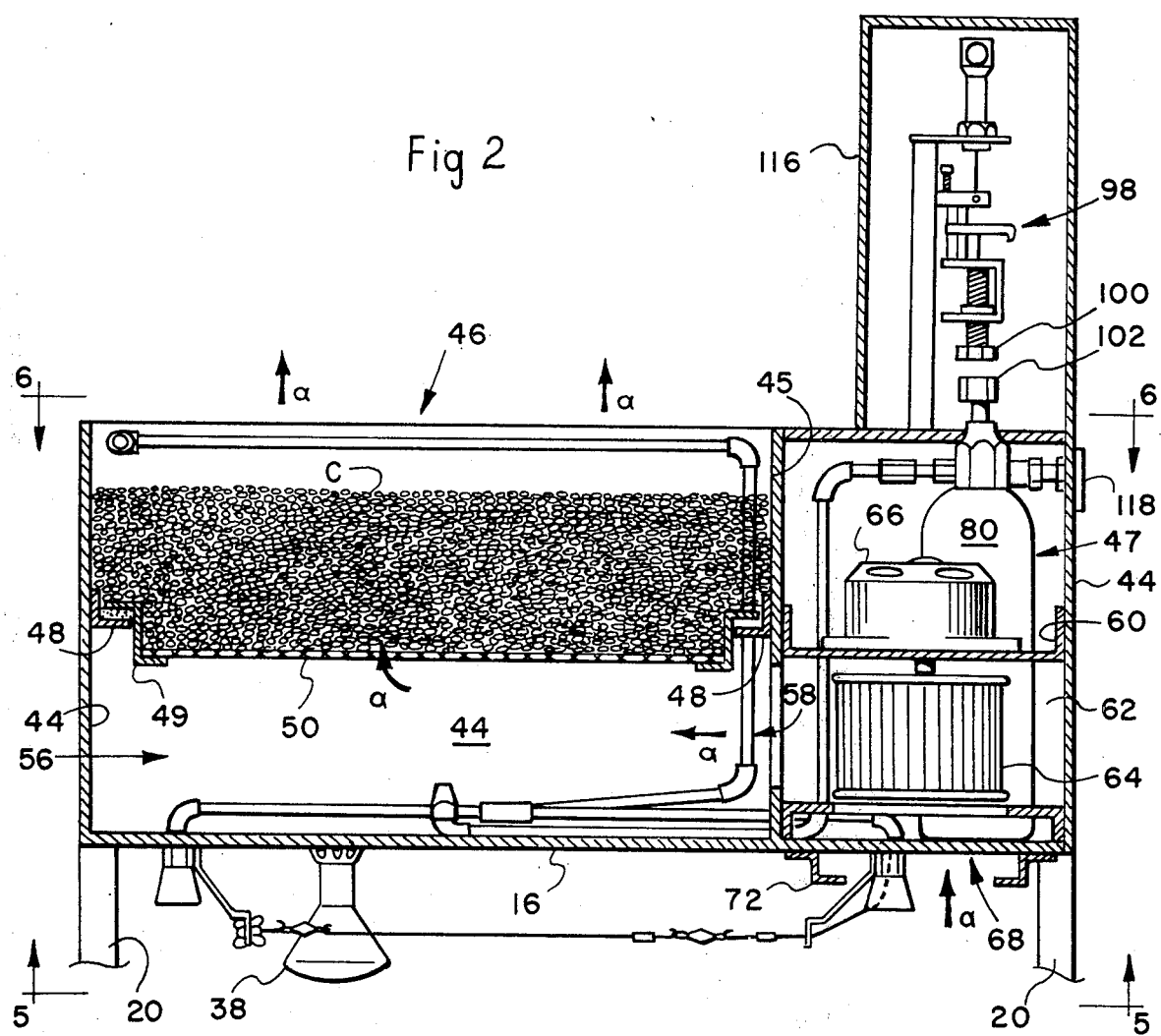
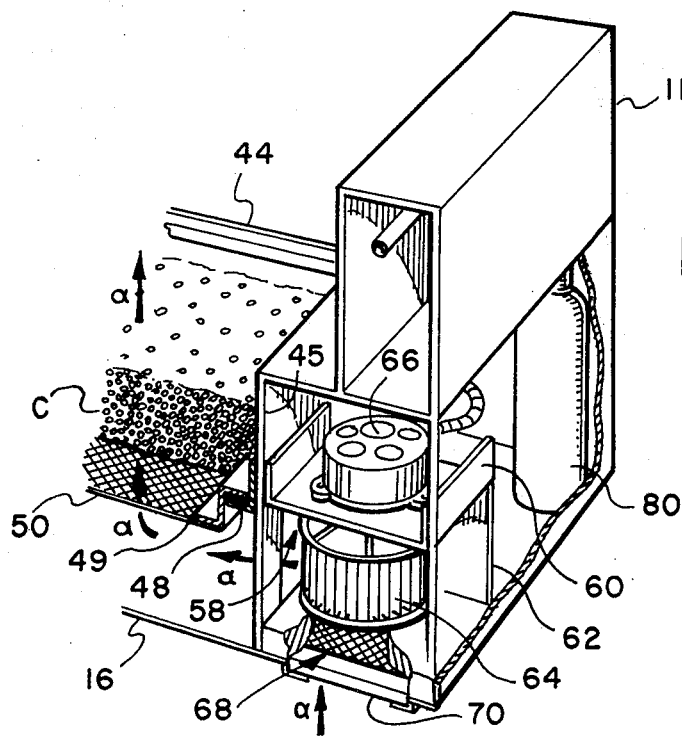

FREE STANDING FRYER

The invention relates to a free standing fryer unit, such as is used for deep-frying items of food in a retail store or fast food counter where ducting facilities cannot be made available.

BACKGROUND OF THE INVENTION

Fryers for the deep drying of food articles such as potatoe chips and the like customarily develop a substantial quantity of fumes from the heated fat, and are usually provided with some form of permanent air ducting and an exhaust fan whereby the fumes are ducted away from the cooking area. However, in many commercial locations it is impractical to provide permanent air duct work. For example, in supermarkets or large chain stores, fast food counters are installed in a variety of locations such that it is not always convenient to provide air duct work. Generally speaking, the absence of such air duct work would render it undesirable to install a deep fat fryer due to the release of unwholesome odours from the heated fat. However, modern eating habits demand to an increasing extent the availability of cooked food snacks at a variety of locations, and accordingly, various attempts have been made in the past to provide free standing fryers which incorporated a deep fat fryer and some form of air exhaust system incorporating a filter to remove such odours. However, such systems as have been available in the past have been relatively inefficient and either the filter has broken down after a very short space of time or it was altogether ineffective, or the servicing of the filters was time consuming and troublesome such that the unit would have to be shut off for substantial lengths of time.

In addition, such free standing fryer units as were available in the past created something of a fire hazard since they did not generally speaking incorporate any automatic fire extinguishing apparatus, such as is customary on permanent commercial cooking installations.

In addition, the design and appearance of such free standing fryers as were previously available was somewhat cumbersome and unattractive and did not create favourable customer reaction in all cases.

BRIEF SUMMARY OF THE INVENTION

The invention therefore seeks to provide a free standing fryer for use in commercial installations which includes a cabinet adapted to be supported at a suitable working height, and having glass panels on some of its sides and at least one open side for access to the interior, and having a fat fryer located within the interior of said cabinet and having in the roof of the cabinet outlet means for fumes from the fat fryer, fan means for extracting air and fumes from said cabinet and through said outlet, a plenum chamber located to one side of said fan means, and opening means communicating from said fan means to said plenum chamber, porous tray means located above said plenum chamber and closing the same, said tray means being adapted to support a predetermined depth of filter media thereon, said filter media being porous to air, and being absorptive with respect to said odours and fumes from said fryer.

More particularly, it is an objective of the invention to provide a fat fryer having the foregoing advantages in which the exhaust opening in the cabinet roof is located to one side of said cabinet, and in which said fan incorporates a motor, and is disposed immediately above said exhaust opening, and is enclosed within a fan chamber and in which said opening means communicating with said plenum is located in a side wall of said fan chamber.

More particularly, it is an objective of the invention to provide a free standing fryer having the foregoing advantages in which said cabinet side walls continue upwardly above said cabinet roof, with said fan and motor and fan chamber located in one corner of said upward extension of said cabinet, and in which said plenum lies between said fan chamber and at least three side walls of said upward extension of said cabinet, with said tray means lying horizontally over said plenum chamber and being removable therefrom for cleaning and access.

More particularly, it is an objective of the invention to provide a free standing fryer having the foregoing advantages incorporating automatic fire extinguishing means provided with jet nozzle means for directing a fire extinguishing medium downwardly into said cabinet, and further jet nozzle means directed upwardly within said plenum chamber for directing a fire extinguishing medium upwardly into said filter media on said tray, and including heat sensitive means in said cabinet responsive to a predetermined elevated temperature in said cabinet to discharge said fire extinguishing medium.

The various features of novelty which characterize the invention are pointed out with particularity in the claims annexed to and forming a part of this disclosure. For a better understanding of the invention, its operating advantages and specific objectives attained by its use, reference should be had to the accompanying drawings and descriptive matter in which there are illustrated and described preferred embodiments of the invention.

BRIEF DESCRIPTION OF THE DRAWINGS

FIG. 2 is a section along the side 2—2 of FIG. 1 showing the upper portion of the free standing fryer;

FIG. 3 is a partial upper perspective illustration showing part of the top portion of the fryer as shown in FIG. 1 with the tray removed and partially cut away;

DESCRIPTION OF A SPECIFIC EMBODIMENT

Figure 1:
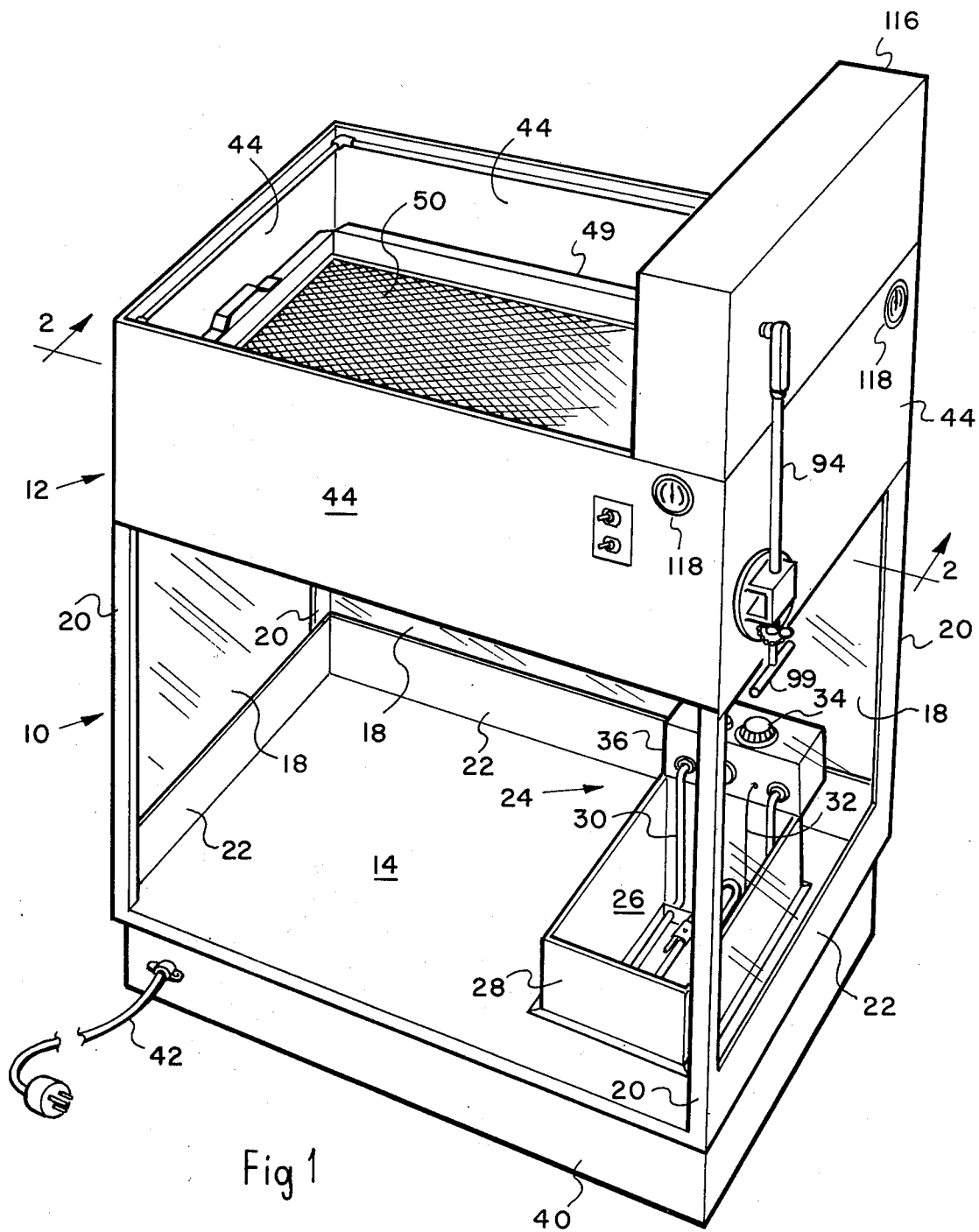
FIG. 1 is a upper perspective illustration of a free standing fryer according to the invention.

Referring initially to FIG. 1, it will be seen that this preferred embodiment of the invention comprises a cabinet chamber indicated generally as 10 and an upper filter portion indicated generally as 12 located immediately above the cabinet 10. The cabinet 10 will normally be supported in a counter, or other installation which may be erected at a suitable location in a store. Alternatively, it may be provided with any suitable stand (not shown) with shelving for storage of supplies. In any event, the cabinet 10 will be supported at essentially waist height or somewhat higher so that a person serving food may stand up and work in comfort at the cabinet 10. Normally, the upper filter portion 12 of the unit will be located at or above the height of the normal individual so that the top of the filter portion 12 will be above the line of sight of the average individual.

The cabinet 10 will be seen to be comprised of a bottom panel 14, and a top panel 16 made of stainless steel, and three vertical window panels 18 made of glass or other suitable transparent material. Four corner columns 20 extend between the bottom 14 and the top 16, and are formed of essentially L-shaped cross-section, preferably of stainless steel, and a lower horizontal frame member 22 extends around three sides of the bottom panel 14 between respective corner columns 20, on three sides of the cabinet.

The fourth side of the cabinet 10 is of course open for access to the interior and for entry of air.

Within the interior, there is located a deep fat fryer indicated generally as 24, and defining a recessed chamber or well 26, extending downwardly beneath the level of the bottom panel 14 of the cabinet 10, and surrounded by upstanding walls 28. Any suitable heater element 30 is located within the chamber 26, and thermostatic control elements 32 also extend downwardly into the chamber 26 for sensing the temperature of the fat therein. A control knob 34 is connected to any suitable heating element control system located within the raised back portion 36 of the fat fryer 24. According to well known practice, the raised back portion 36 may also contain any suitable form of electrical relays for disconnecting the heating element 30 if the temperature of the fat in the chamber 26 rises above a predetermined level.

Cooked food products will normally be retained within the cabinet 10 until sold, and may be placed on the bottom panel 14 beside the fat fryer 24 so that they are displayed for sale. In this location they may be kept warm by means of the heating lamp 38 mounted on the underside of the top panel 16 of the cabinet 10 (FIG. 2).

Below the bottom panel 14 of the cabinet 10, a downwardly dependent inwardly offset wall portion 40 may be provided for interlocking with a suitable stand or table (not shown), or for locating the entire cabinet 10 on any suitable countertop (not shown) so that the bottom panel 14 of the cabinet 10 may be located at or slightly above waist height. Any suitable electrical cable 42 may be provided for connecting the entire cabinet 10 to suitable source of electrical supply.

Figure 4:
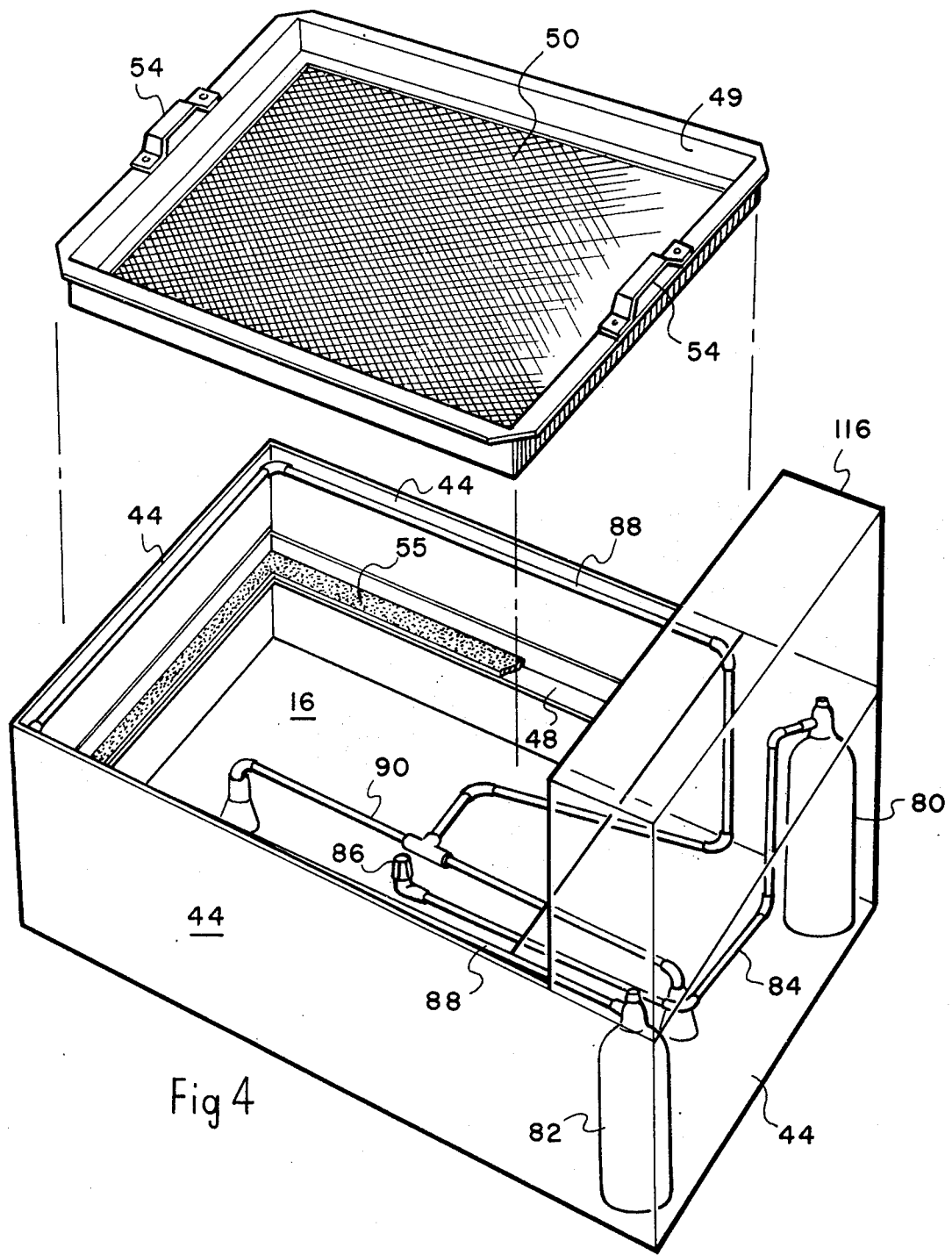
FIG. 4 is an exploded upper perspective view of the top portion of the fryer according to the invention, showing the layout of the fire extinguishing system.
Figure 5:
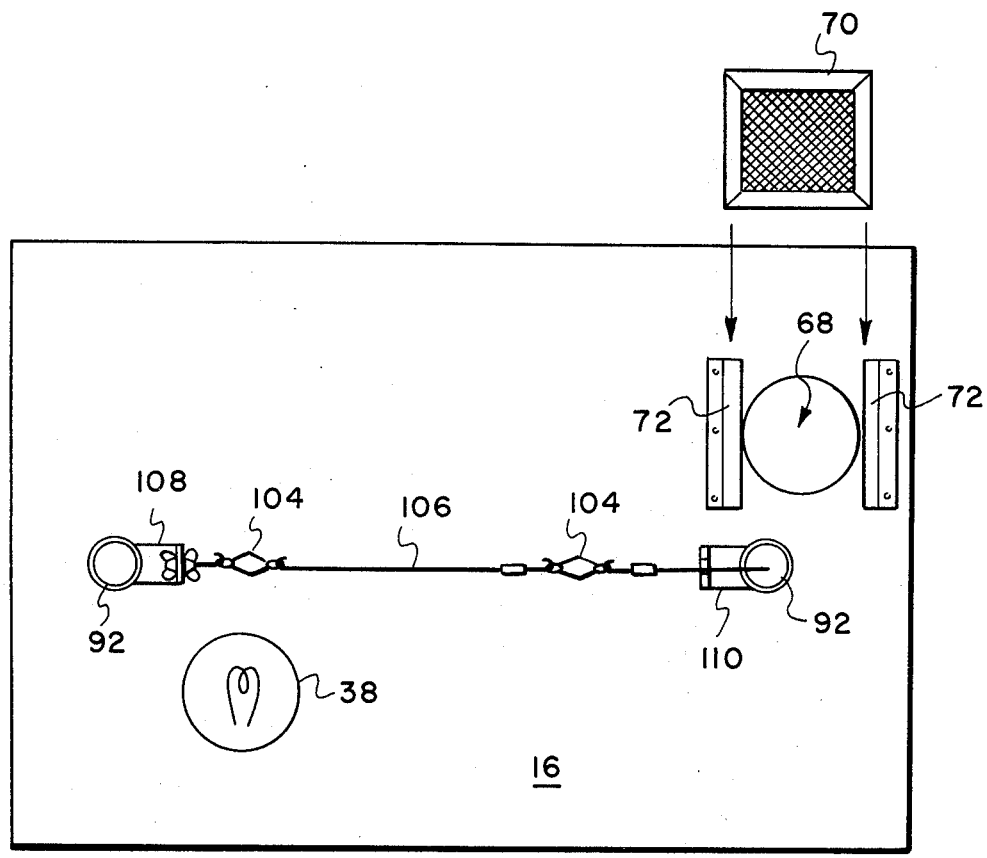
FIG. 5 is a bottom plan view of the top portion of the dryer as shown in FIGS. 1 and 2.
Figure 6:
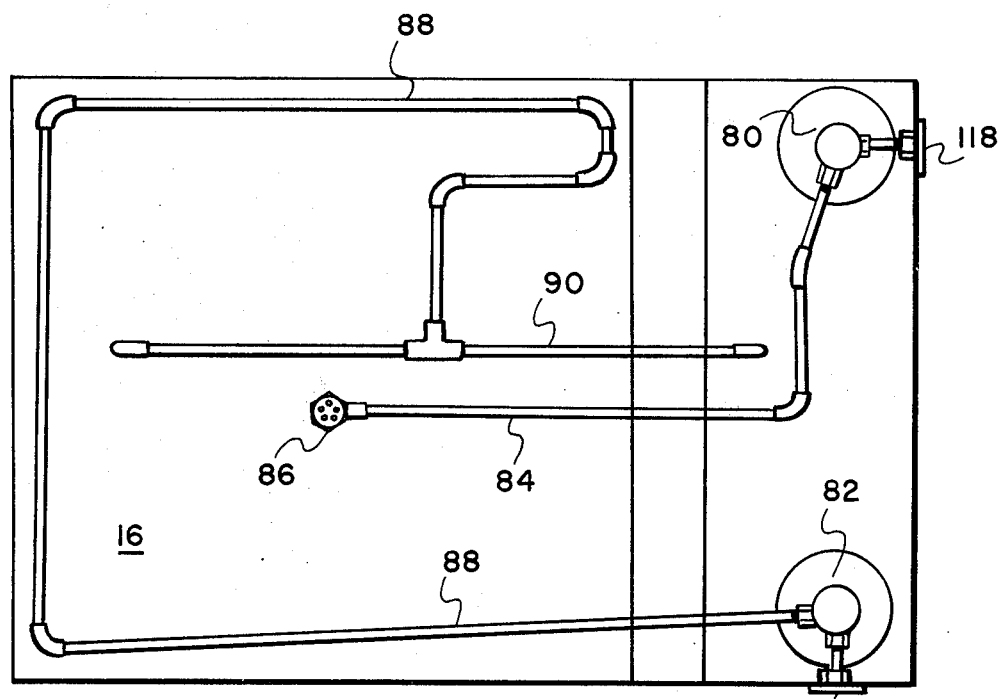
FIG. 6 is a schematic top plan view of the fryer of FIG. 1, showing the layout of the fire extinguishing system.
Figure 7:
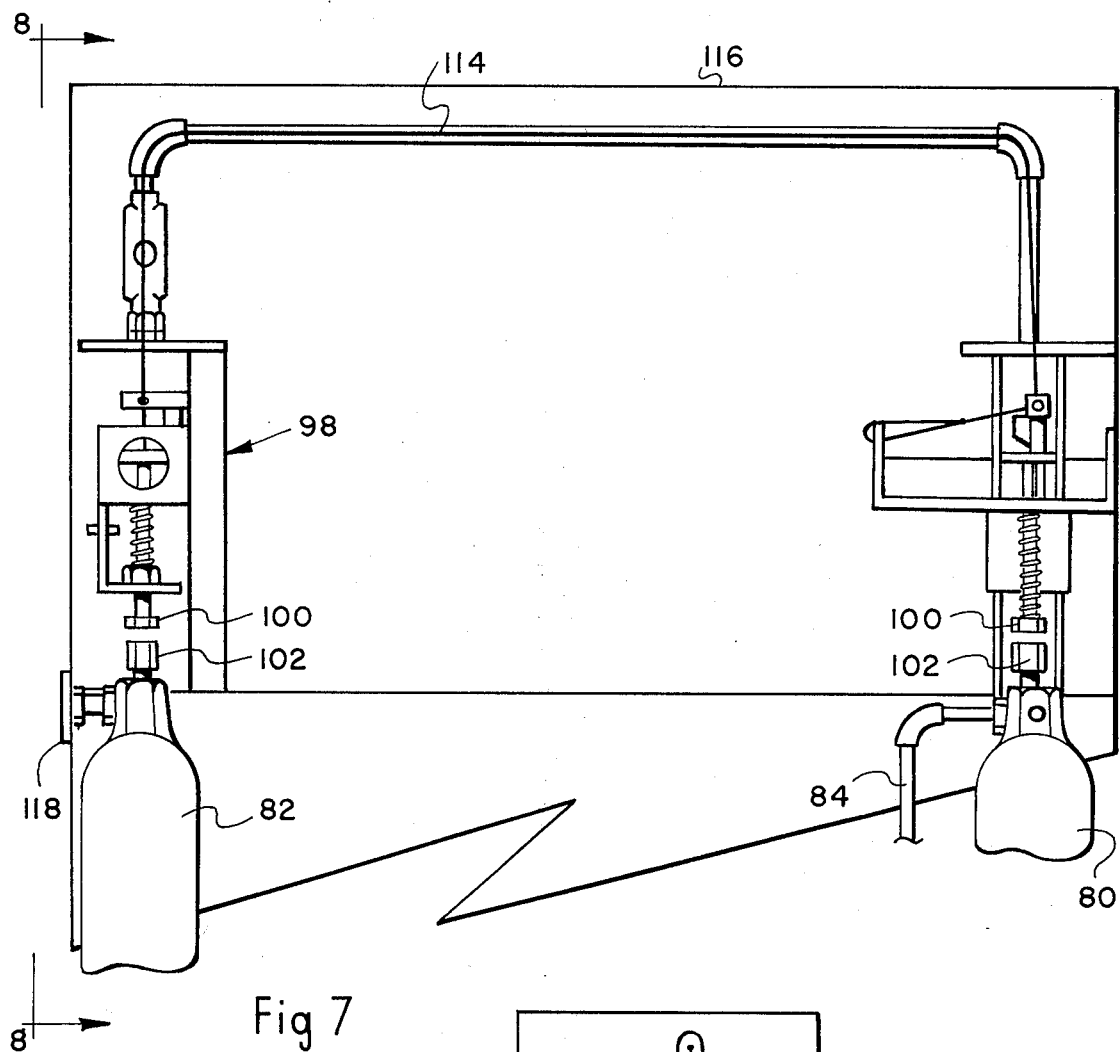
FIG. 7 is a cut-away end elevation of the top portion of the fryer of FIG. 1 showing the fire extinguishing system, and, FIG. 8 is a partial cut-away side elevational view showing further details of the fire extinguishing system.
Figure 8:
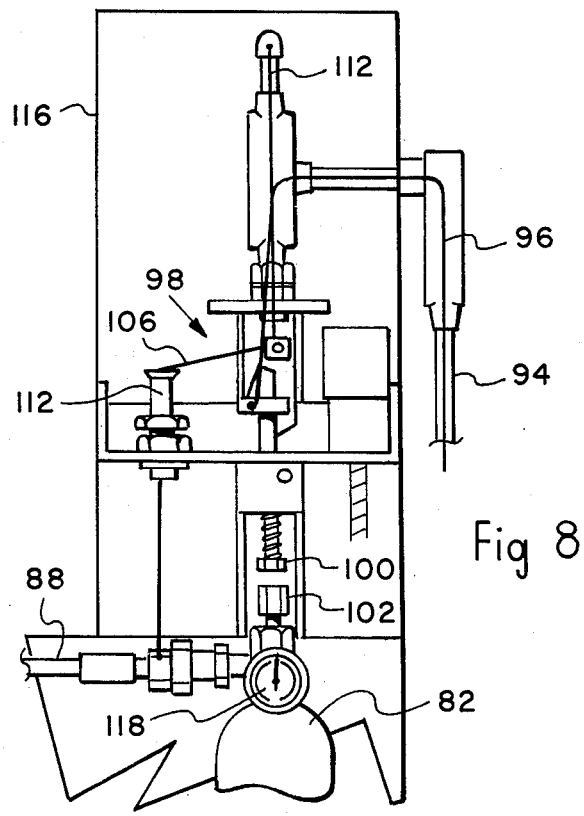

As best shown in FIGS. 2, 3 and 4, the upper filter portion 12 of the cabinet 10 will be seen to comprise four upstanding side walls 44 formed of stainless steel, and preferably formed integrally with the four side support columns 20. The side walls 44 are closed at the bottom thereof by the top panel 16 of the cabinet 10, but at their upper ends are open to the atmosphere, and thus define an essentially rectangular open topped chamber.

A vertical partition wall 45 extends between the front and back side walls 44 offset to the right hand thereof, dividing the upper portion 12 into a larger space 46 on the left and a smaller space 47 on the right.

Approximately, half way down the walls 44 and 45, located in the larger space 46 there is a continuous L-shaped support shelf 48, which is designed to support a removable filter tray 49. The tray 49 has a wire mesh portion 50, supported by a rectangular frame 52, which is designed to seat on the shelf 48, thereby supporting the mesh portion 50 essentially horizontally within the space 46 as shown. A pair of handles 54 may be provided on the frame 52 for raising the tray 49 out of the space 46. An air seal 55 is located around the shelf 48.

The tray 49 is designed to hold a substantial quantity of filter media, such as charcoal C or the like which may be stacked on the tray 49 to a depth of 4 to 6 inches or more so as to essentially fill the upper half of the space 46.

The lower portion of the space 46 ie. that space below the tray 49 is designated as the filter plenum 56, which clearly consists of an essentially rectangular space enclosed on four sides by the walls 44 and 45, and on the lower side by the top panel 16 of the cabinet 10, and on its upper side by the tray 49. Air or fumes entering the plenum 56 will thus have to pass upwardly through the wire mesh screen 50 and through the charcoal or other filter media lying on the tray 49. As shown, the plenum 56 occupies approximately three-quarters of the area of the top panel 16 of the cabinet 10, and the filter area thus provided for filtering the fumes and air entering the plenum 56 is very substantial, and provides for efficient filtering out of undesirable odours and fumes in the air passing therethrough.

Air and fumes enter the filter plenum 56 by means of an opening 58 formed in the lower portion of the partition wall 45. Within the space 47, defined by the partition 45, a fan chamber is provided by means of an upper wall 60 and back panel 62 which, together with the adjacent portions of the side wall 44 provide an essentially rectangular enclosure or fan chamber. Within the fan chamber, there is located any suitable form of fan means such as the centrifugal fan 64, driven by the motor 66 mounted above upper wall 60. Preferably, the fan 64 will have a fairly substantial air flow capacity in relation to the overall size of the cabinet 10 so as to cause a substantial air flow therethrough during use.

Air enters the fan chamber through the opening 68 formed in the top wall 16 of the cabinet in registration with the fan 64. The opening 68 is preferably located as nearly as possible directly over the fat fryer unit 64.

If desired, additional filtering may be provided by means of a rectangular filter element 70, which may be slidably retained by means of the brackets 72 in registration with the opening 68.

In this way, when the fan 64 is operating, air will be drawn inwardly through the opening 68 as shown by the arrows A and be expelled through the opening 58 in the partition 45, thereby entering the plenum 56. The air will of course then be forced through the tray 50 and through the charcoal lying on the tray and be vented to atmosphere. Such air will enter the cabinet 10 through its open side.

As the filter media such as charcoal on the tray 49 becomes plugged, it can simply be emptied out, and the tray 49 can be lifted out and cleaned, and fresh filter media can be added.

In this way, a sufficient volume of filter media can be employed which is sufficiently great, in relation to the air flow, and the volume of fumes to be extracted, that it will be substantially completely effective in removing odours and fumes from the air so that the air can be safely vented within the space such as a retail store without fear that there will be any noticeable odours. Such a filter system can operate over quite extended periods of time without requiring cleaning or replacement, and servicing is relatively inexpensive.

The invention provides further features directed towards the safety of operation of the apparatus. Such features comprise means for extinguishing fires both within the cabinet 10, and also within the upper portion 12 of the unit, if for example the charcoal or other filter media should catch fire due to some malfunction of the apparatus.

Such fire extinguishing systems are shown more clearly in FIGS. 4 to 8 and comprise the two fire extinguisher pressure flasks 80, 82 which are preferably located in the smaller right hand space 47 of the upper portion 12 of the unit. Such flasks may be of any conventional design containing any suitable form of fire extinguishing medium which is well known in the art. Flask 80 will be seen to be connected by means of a pipe 84 which extends through the partition 45 and along the bottom of the filter plenum 56. At the free end of the pipe 84, more or less in the center of the filter plenum 56, there is an upwardly directed outlet nozzle 86, preferably being provided with a plurality of fine jet openings, whereby the fire extinguishing medium may be directed outwardly into all areas of the filter plenum and upwardly into the charcoal lying in the tray 49.

The flask 82 is designed to provide a fire extinguishing medium for the cabinet 10. For this purpose, it is necessary that it be allowed to build up sufficient pressure in the system, when it is called upon to operate, so as to provide effective jets in a downward direction. For this purpose, it is necessary that it is connected by means such as a pipe 88 which must be of a certain minimum length to provide suitable pressure build-up for the type of fire extinguishing medium being used. With this purpose in mind, the pipe 88 extends around the top of the larger space 46 in an essentially rectangular manner, and then extends downwardly against one of the side walls 44, and along the upper surface of the top wall 16 of the cabinet 10 until it meets the branch pipe 90. The branch pipe 90 is connected at each end to downwardly directed nozzles 92 which are provided with suitable jet orifices (not shown) for directing streams of fire extinguishing medium downwardly within the cabinet 10.

The flasks 80 and 82 are sealed in any conventional manner, and may be activated for example manually, by means of the manual release system consisting of a tube 94 on the exterior of the upper portion 12 containing suitable wires or cables 92 connected to the release triggers 98 and operated by handle 99. These triggers may be of any well known design, and are designed to release the spring plungers 100 which will then strike the strikers 102, thereby discharging the contents of the flasks 80 and 82.

In order to provide for automatic discharge of the fire extinguishing system, any suitable heat sensitive means may be provided. In this case it will be seen (FIGS. 2 and 5) to comprise the pair of heat fusible links 104 connected by means of wires 106 to a tang 108 at one end.

The other end of the wire 106 extends around a slide member 110 and then passes upwardly through the nozzle 92, and up through the branch pipe 90 and into the pipe 88. The wire 106 is then lead out of the pipe 88 and up through guide 112 (FIG. 8) and is connected with one of the triggers 98. A further wire 114 connects with the other trigger 98, for the flask 80 so that upon the operation of the trigger 98 for the flask 82, by the wire 106, the other trigger 98 will simultaneously be operated by the wire 114.

In this way, if a fire should develop in the cabinet 10, one or other of the heat fusible links 104 will melt therefor releasing the wire 106 which will then release the trigger 98 for the flask 82 and at the same time operate the trigger 98 for the flask 80, and in this way both flasks will be released thereby discharging their contents through the various nozzles as described.

In order to provide an attractive clean appearance, and to conceal the flasks 80 and 82 and the associated system of pipes from view, a generally rectangular upper housing 116 is provided which consists essentially of an upward extension of the side walls 44 of the upper portion 12, and of the partition 45 to provide a rectangular shaped box-like enclosure.

Pressure gauges 118 connected to each of the flasks 80 and 82 may be provided on the side walls 44 so that the system may be checked from time to time.

The foregoing is a description of a preferred embodiment of the invention which is given here by way of example only. The invention is not to be taken as limited to any of the specific features as described, but comprehends all such variations thereof as come within the scope of the appended claims.

What is claimed is:

1. A free standing fryer unit adapted for use in an enclosed space without connection to a ventilation system, said unit comprising:
   a cabinet adapted to be supported at a suitable working height and having a floor, a roof and sides, at least one of said sides being open for access to the interior;
   a cooking receptacle located in said cabinet in a predetermined location and adapted to be connected to a source of heating power;
   outlet means located in said roof above said receptacle for passage of fumes from said cabinet and incorporating exhaust fan means;
   wall means defining a chamber having an open side, located above said roof;
   opening means in said wall means for passage of fumes from said exhaust fan means into said chamber; and,
   filter means removably positionable in said open side of said chamber whereby said fumes may pass therethrough, said filter means being absorptive of the odour of said fumes and in a sufficient quantity to effectively deodorise the same for a reasonable working period.

2. A free standing fryer unit as claimed in claim 1, wherein said wall means defining said chamber comprise four side walls defining a generally rectangular upward extension of said cabinet, and a vertical partition wall extending across said extension dividing said upward extension into a larger extension portion, comprising said chamber and a smaller extension portion located over said cooking receptacle.

3. A free standing fryer unit as claimed in claim 2, wherein said opening means is located in said partition wall, and wherein said outlet means communicates between said cabinet and said smaller extension portion, and wherein said exhaust fan means is located in said smaller extension portion.

4. A free standing fryer unit as claimed in claim 3 including supporting ledge means defining said open side of said chamber and attached around the interior of said wall means and said partition wall, defining said larger portion of said upward extension, and filter tray means adapted to be received on said ledge means, said filter tray means carrying suitable filter media thereon.

5. A free standing fryer unit as claimed in claim 4 wherein said wall means at least extends upwardly above said ledge means whereby said ledge means, and said filter tray located thereon, is effectively concealed from view.

6. A free standing fryer unit as claimed in claim 5 including further partition wall means in said smaller extension portion, and defining a fan chamber around said exhaust fan means at one end of said smaller portion.

7. A free standing fryer unit as claimed in claim 6 including fire extinguishing media storage means, for storing suitable fire extinguishing media under pressure, located within said smaller portion of said upward extension, adjacent to said fan chamber, and including conduit means connected with said storage means for communicating said fire extinguishing media to said cabinet, and to said chamber simultaneously, and including heat sensitive means responding to an elevated temperature within said cabinet, to release said extinguishing media.

8. A free standing fryer unit as claimed in claim 7 including further filter means located on said roof of said cabinet, within said cabinet, in registration with said outlet means.

9. A free standing fryer unit as claimed in claim 8 including a food storage space located on said floor of said cabinet beside said cooking receptacle, and warming means for warming food stored in said space, located within said cabinet.

* * * * *